United States Patent [19]
Wang

[11] Patent Number: 5,931,598
[45] Date of Patent: Aug. 3, 1999

[54] ASSEMBLY FOR CONNECTING TUBES

[76] Inventor: Chi-Chung Wang, No. 248, Chung Ching St., San Min Dist., Kaohsiung, Taiwan

[21] Appl. No.: 08/968,421

[22] Filed: Nov. 12, 1997

[51] Int. Cl.[6] .................................................. B25G 3/00
[52] U.S. Cl. ........................ 403/351; 403/367; 403/374; 285/148.27
[58] Field of Search .................................. 403/351, 350, 403/367, 374, 343, 361; 285/148.27, 358

[56] References Cited

U.S. PATENT DOCUMENTS

| | | | |
|---|---|---|---|
| 2,546,157 | 3/1951 | Hume | 403/351 |
| 3,697,104 | 10/1972 | Soulie et al. | 403/343 X |
| 4,697,949 | 10/1987 | Perez | 403/361 |
| 5,172,447 | 12/1992 | Tomm | 403/343 X |
| 5,404,769 | 4/1995 | Kao | 403/351 X |
| 5,694,695 | 12/1997 | Lund | 403/351 X |

*Primary Examiner*—Brian K. Green
*Assistant Examiner*—William L. Miller
*Attorney, Agent, or Firm*—Foley & Lardner

[57] ABSTRACT

A connecting assembly includes a first tube having an oval inner periphery with a boss extending from an outer periphery thereof, a second tube having a circular outer periphery and a sleeve connected the first and the second tube together. The sleeve has an inner tube which connects to two end plates extending radially and inwardly from one of two ends thereof so as to define a cylindrical recess between the sleeve and the inner tube. The inner tube has an oval outer periphery and two slots defined diametrically opposite therein. The sleeve has a transverse opening defined therein and which communicates with one of the two slots. A longitudinal recess is defined in an inner periphery of the sleeve and which communicates with the transverse opening so that the second tube and the first tube are firmly and respectively received in the inner tube and the tubular recess by rotating the sleeve.

5 Claims, 3 Drawing Sheets

ASSEMBLY FOR CONNECTING TUBES

BACKGROUND OF THE INVENTION

1. Field of the Invention

The present invention relates to a connecting assembly and, more particularly, to an improved connecting assembly for connecting two tubes by simply rotating a sleeve which receives two tubes to be connected.

2. Brief Description of the Prior Art

FIG. 1 shows a conventional assembly for connecting two tubes 40, 60. The tube 40 includes a plain portion 41 integrally extending from a body, a central portion 42 with a thread formed on an outer periphery thereof, and a flange 45 extending longitudinally from the central portion 42, The flange 45 is tapered inward towards a free end thereof and defines two diametrically opposed slots. The tube 60 is able to be received in the tube 40. A sleeve 50 has an inner threaded portion 51 defined in an inner periphery thereof and an engaging surface 52 defined in the inner periphery thereof next to the inner threaded portion 51. The tube 60 extends through the sleeve 50 and is received in the tube 40. The sleeve 50 is threadedly engaged with the central portion 42 so that the engaging surface 52 contacts and compresses the flange 45 inwardly and radially to position the tube 60. In order to compress the flange 45, a certain number of revolutions of the sleeve 50 is required. This tales time and a large torque has to be applied to the sleeve 50.

The present invention intends to provide an improved connecting assembly for connecting tubes to mitigate and/or obviate the above-mentioned problems.

SUMMARY OF THE INVENTION

The present invention provides a connecting assembly which includes a first tube which has an oval inner periphery defined therein with a boss extending from an outer periphery thereof, a second tube having a circular outer periphery and a sleeve. The sleeve has a first end and a second end from which two end plates extend radially and inwardly, and an inner tube extending longitudinally from the two end plates. The inner tube is located in the sleeve so as to define a tubular recess between it and the sleeve. The inner tube has two slots defined longitudinally therein and which are located opposite to each other. The inner tube further has a circular inner periphery and an oval outer periphery. The sleeve has a transverse opening defined therethrough and communicates with one of the slots. A longitudinal recess is defined in an inner periphery of the sleeve and communicates with the transverse opening. The second tube is received in the inner tube and the first tube is inserted in the tubular recess of the sleeve with the boss extending from the transverse opening via the longitudinal recess so that when rotating the sleeve, the first and the second tube are firmly connected.

It is an object of the present invention to provide a connecting assembly which is easily operated.

It is another object of the present invention to provide a connecting assembly which utilizes different thicknesses of the inner tube and the first tube to firmly connect two tubes together by a sleeve.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
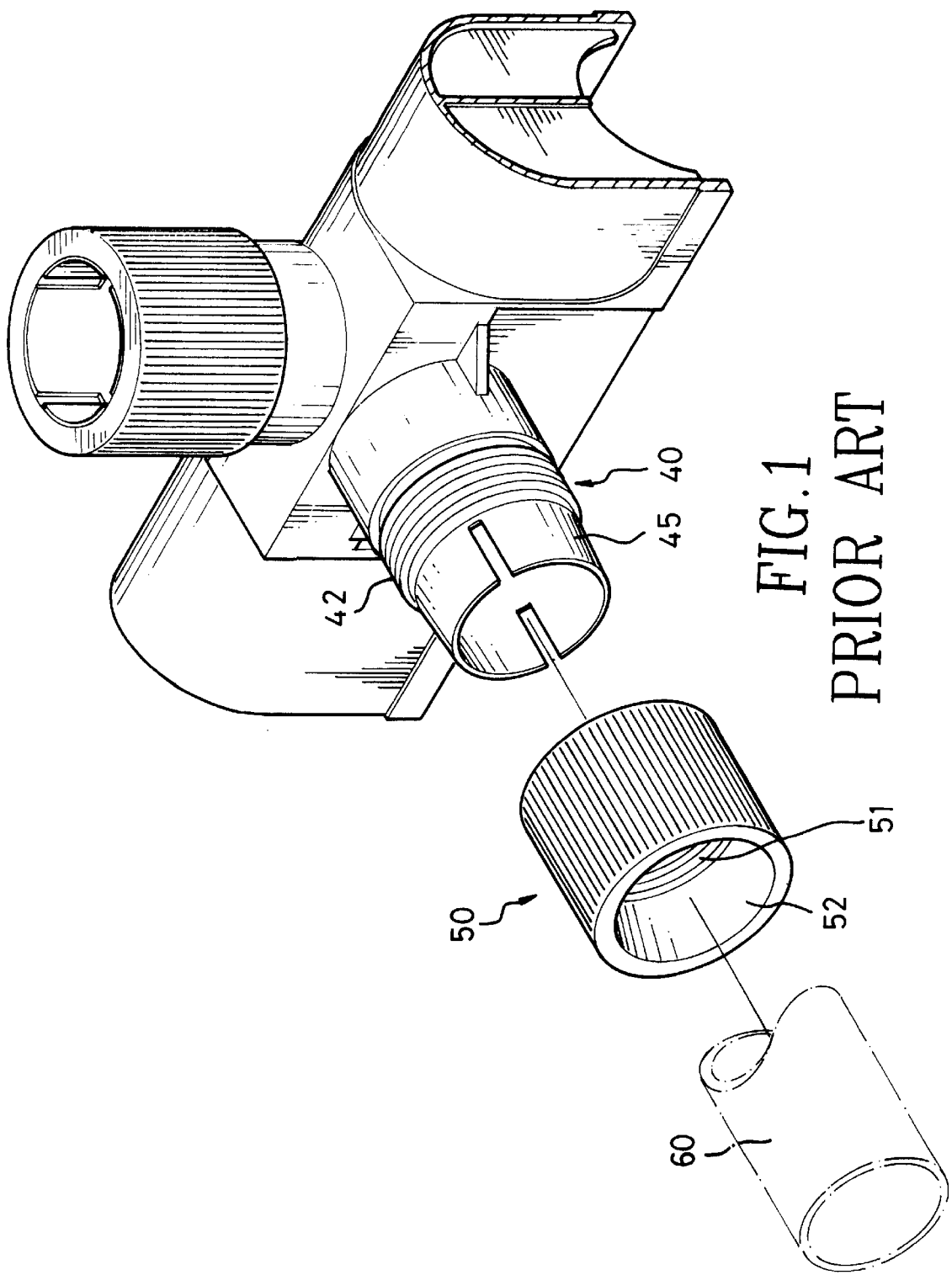
FIG. 1 is an exploded view of a conventional connecting assembly.
Figure 2:
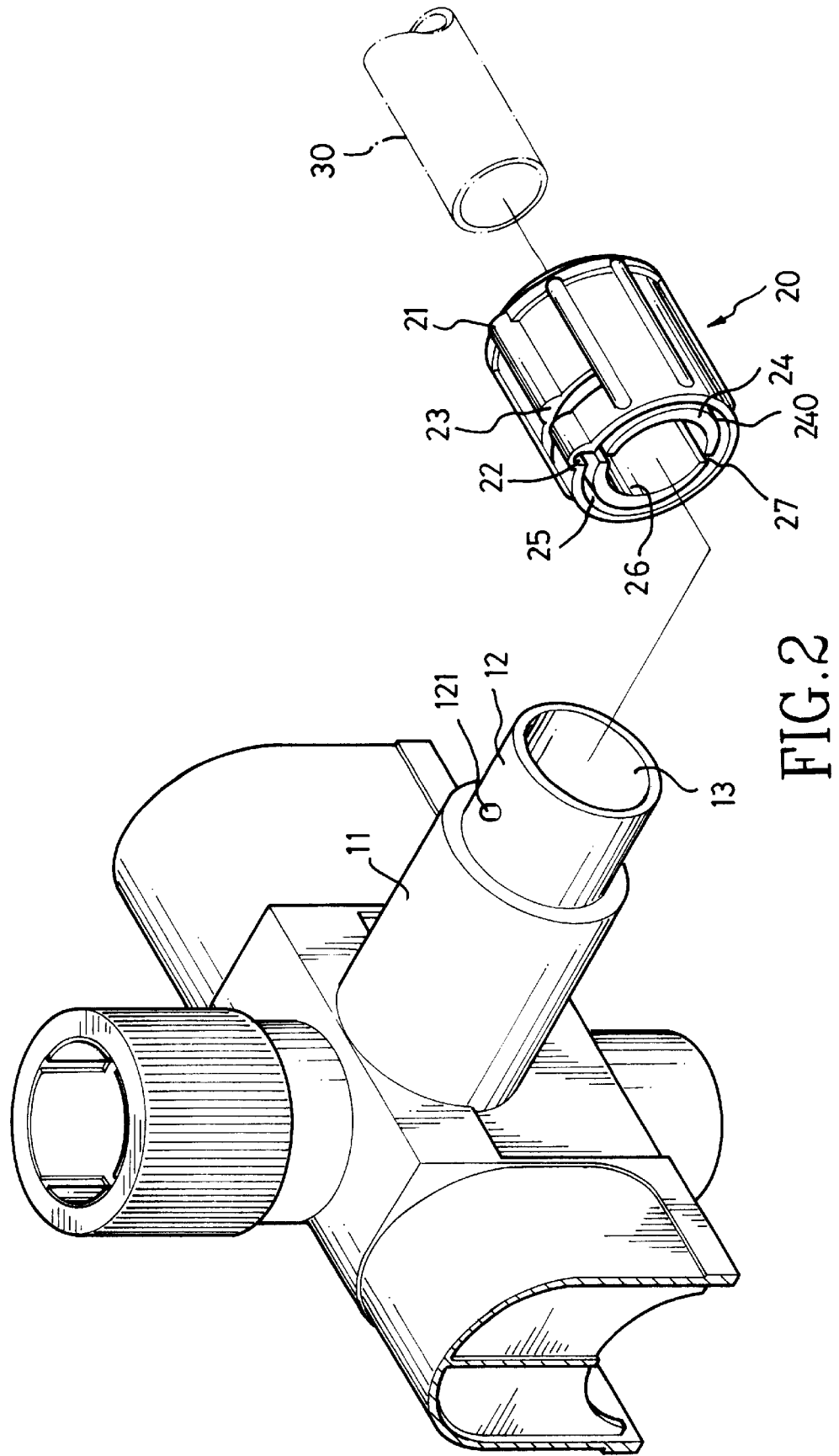
FIG. 2 is an exploded view of a connecting assembly in accordance with the present invention.
Figure 5:
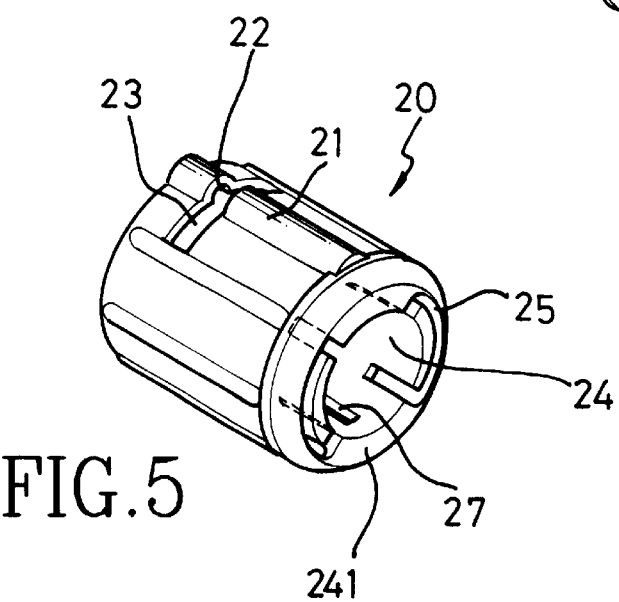
FIG. 5 is a perspective view, seen from a second end, of the sleeve in accordance with the present invention.

Referring to the drawings and initially to FIGS. 2 and 5, a connecting assembly in accordance with the present invention generally includes a first tube 11 which has a fitting portion 12 extending longitudinally therefrom which has an oval inner periphery 13 defined therein and a boss 121 extending from an outer periphery of the fitting portion 12, a second tube 30 having a circular outer periphery and a sleeve 20 having a plurality of ridges 21 extending longitudinally and outwardly from an outer periphery thereof. The fitting portion 12 has a circular outer periphery and the boss 121 is located on a short axis of the oval inner periphery 13 so that a thickness of the fitting portion 12 on the short axis is thicker than that on a long axis of the oval inner periphery 13. The sleeve 20 has a first end and a second end. Two end plates 241 extend radially and inwardly (see FIG. 5) from the second end of the sleeve 20. An inner tube 24 extends longitudinally from the two end plates 241 and is located in the sleeve 20 so as to define a cylindrical recess 25 between the sleeve 20 and the inner tube 24. The inner tube 24 has two slots 27 defined longitudinally therein and diametrically opposite to each other. The inner tube 24 further has a circular inner periphery 26 and an oval outer periphery 240. The two slots 27 are located on a snort axis of the oval outer periphery 240 of the inner tube 24 so that a thickness of the inner tube 24 on the short axis of the outer oval periphery 240 is thicker than that on a long axis of the outer oval periphery 240. A transverse opening 23 is defined through the sleeve 20 and communicates with one of the slots 27. A longitudinal recess 22 is defined in an inner periphery of the sleeve 20 and communicates with the transverse opening 23.

Figure 4:
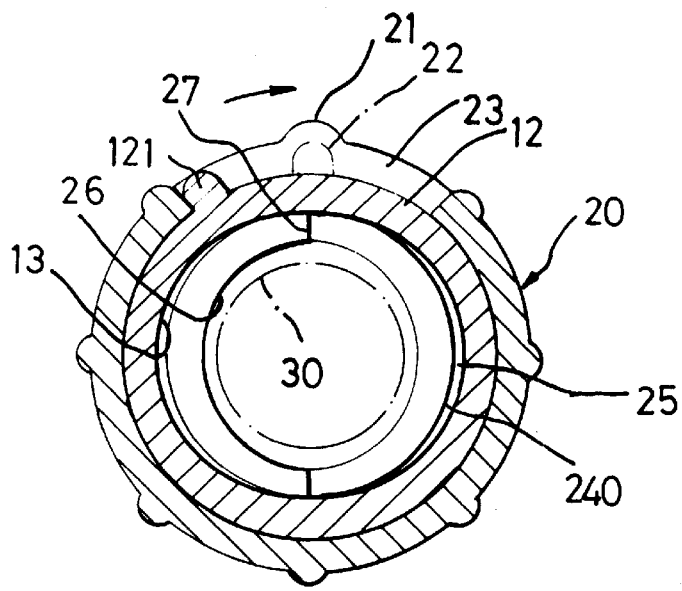
FIG. 4 is an end elevational view, partly in section, of the connecting assembly when the sleeve is not rotated.
Figure 3:
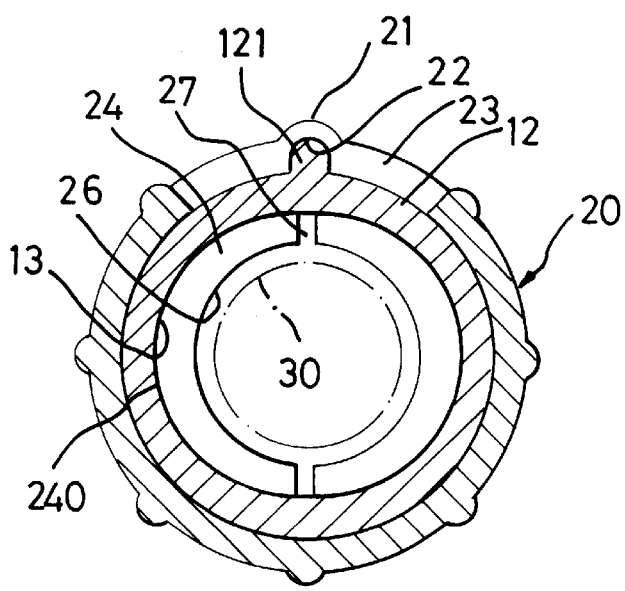
FIG. 3 is an end elevational view, partly in section, of the connecting assembly when a sleeve is not rotated.

When operating the connecting assembly, referring to FIGS. 3 and 4, the second tube 30 is received in the inner tube 24 which has the circular inner periphery 26, and the fitting portion 12 of the first tube 11 is inserted in the cylindrical recess 25 of the sleeve 20 with the boss 121 extending from the transverse opening 23 via the longitudinal recess 22 and one of the two slots 27 of the inner tube 24. At this moment, as shown in FIG. 3, two thicker portions located on the short axis of the oval inner periphery 13 of the fitting portion 12 are located on the short axis of the oval outer periphery 240 of the inner tube 24. The second tube 30 is not yet clamped by the inner tube 24. When rotating the sleeve 20 as shown in FIG. 4, the inner tube 24 is rotated with the sleeve 20 so that thicker portions of the inner tube 24 on the long axis of the oval outer periphery 240 are rotated to a position snugly beneath the thicker portions of the fitting portion 12 so as to narrow the two slots 27 to clamp the second tube 30 in the inner tube 24.

Accordingly, the operation of rotating the sleeve 20 of the connecting assembly is easy and requires little strength. The connecting assembly of the present invention arranges the two oval peripheries 13, 240 in different relative relationships to achieve a purpose of firmly connecting two tubes 11, 30. Only a short operation distance is required when rotating the sleeve 20 so that the operation time is short and the operation process is simple. The ridges 21 of the sleeve 20 provide a sure grip to an operator's hand.

Although the invention has been explained in relation to its preferred embodiment, it is to be understood that many other possible modifications and variations can be made without departing from the spirit and scope of the invention as hereinafter claimed.

What is claimed is:

1. A connecting assembly comprising a first tube which has an oval inner periphery defined therein and a boss extending from an outer periphery thereof, a second tube having a circular outer periphery and a sleeve having a first end and a second end from which two end plates extend radially and inwardly, an inner tube extending longitudinally from said two end plates and located in said sleeve so as to define a cylindrical recess between said sleeve and said inner tube, said inner tube having two slots defined longitudinally therein and located diametrically opposite to each other, said inner tube having a circular inner periphery and an oval outer periphery, said sleeve having a transverse opening defined therethrough which communicates with one of said slots, a longitudinal recess defined in an inner periphery of said sleeve and communicating with said transverse opening, said second tube received in said inner tube and said first tube inserted in said cylindrical recess of said sleeve with said boss extending from said transverse opening via said longitudinal recess so that when rotating said sleeve, said first and said second tube are firmly connected.

2. The assembly as claimed in claim 1 wherein said boss is located on a short axis of said oval inner periphery of said first tube.

3. The assembly as claimed in claim 1 wherein said two slots are located on a short axis of said oval outer periphery of said inner tube.

4. The assembly as claimed in claim 1 wherein said sleeve has a plurality of ridges extending longitudinally and outwardly from an outer periphery thereof.

5. The assembly as claimed in claim 1 wherein the outer periphery of said first tube is circular.

* * * * *